May 1, 1956   A. P. GIRAITIS ET AL   2,744,007
PROCESS OF RECOVERING ALKALINE EARTH METAL FROM
ALKALI METAL-ALKALINE EARTH MIXTURES
Filed Dec. 11, 1952
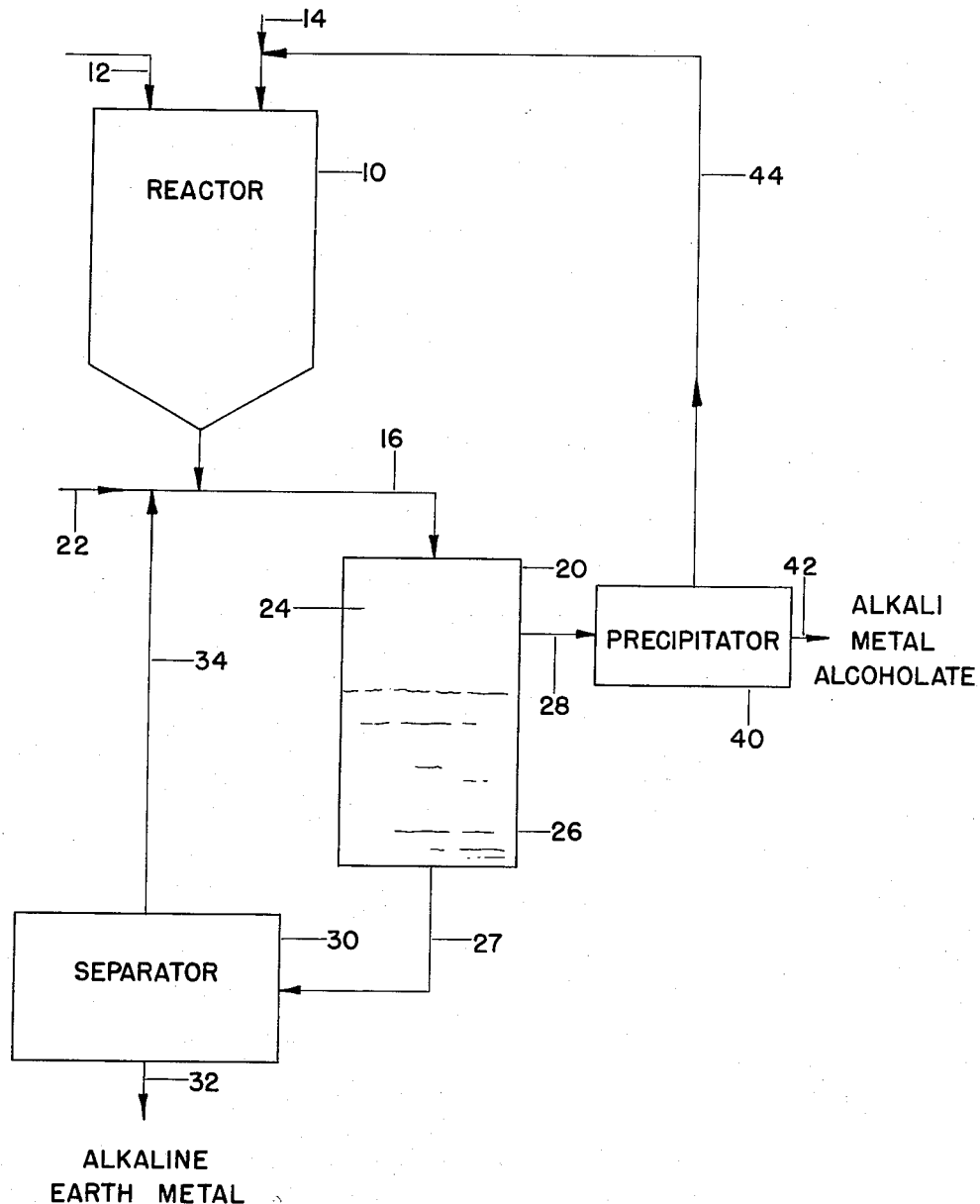
INVENTOR.
ALBERT P. GIRAITIS
ARTHUR F. LIMPER
WILFORD H. THOMAS
BY

2,744,007
PROCESS OF RECOVERING ALKALINE EARTH METAL FROM ALKALI METAL-ALKALINE EARTH MIXTURES

Albert Philip Giraitis, Arthur Frederick Limper, and Wilford Harold Thomas, Baton Rouge, La., assignors to Ethyl Corporation, New York, N. Y., a corporation of Delaware Application December 11, 1952, Serial No. 325,457

6 Claims. (Cl. 75—99)

This invention relates to the recovery of useful values from mixtures of alkali metals and alkaline earth metals.

Mixtures of the above types of metals are dangerous to handle by reason of their reactivity. At the same time some mixtures, particularly of sodium and calcium, are produced as commercial by-products in large quantities and must be disposed of in some way. Thus, in the production of sodium by electrolysis of a fused bath of sodium and calcium chlorides, the crude sodium as produced is first treated to separate out an accompanying sludge. This sludge is a mixture of metallic sodium and metallic calcium, along with a minor percentage of salts such as chlorides and oxides.

U. S. Patent No. 2,543,406, granted February 27, 1951, teaches the reaction of mixtures of this type with lower aliphatic alcohols to preferentially dissolve the alkali metal and leave the alkaline earth metal substantially unreacted. This effects a ready separation, and both the alkaline earth metal as well as the alkali metal alcoholate can be recovered as useful products. In conducting this process an excess of alcohol is used so as to insure a complete reaction. Although the process is generally satisfactory for recovering metallic calcium from small batches of electrolytic sludge, some difficulty has been experienced in the separation step when the operations are carried out on a commercial or semi-commercial scale. It has been observed that when calcium and alcohol are co-present in certain proportions, a violent reaction tends to occur. Although this critical ratio has not been determined with certainty, it has been found that when using methanol as the solvent, for example, if the ratio of alcohol to calcium is permitted to fall to about 1:1, this violent reaction may take place. Since an excess of alcohol is present in the reaction mixture, it is necessary to pass through this critical range during the separation of calcium from the reactor solution, thereby increasing the hazard to operating personnel and rendering the process commercially unattractive.

Among the objects of the present invention is the avoidance of the above and related disadvantages.

Further objects of the present invention include the provision of a recovery technique which makes possible a safer separation of the alkali and alkaline earth metals.

The above as well as still further objects of the present invention will be more clearly understood from the following description of several of its exemplifications, reference being made to the accompanying drawing in which is schematically shown a flow diagram illustrating some of its essential features.

According to the present invention a mixture of alkali and alkaline earth metals is treated with a lower aliphatic alcohol in accordance with the process described in the aforementioned patent and after the reaction with the alkali metal is substantially completed, the reaction mixture is stratified over a liquid denser than this mixture but inert to and not denser than the alkaline earth metal, to cause the alkaline earth metal in the reaction mixture to settle down into said liquid. The lower alkaline-metal-carrying liquid is then separated and the alkaline earth metal removed from it. In this way the ultimate separation of alkaline earth metal is accomplished without passing through the aforementioned critical ratio of alcohol to alkaline earth metal, thereby eliminating the hazards heretofore existing when this separation was attempted.

It is preferred to include in the inert liquid a wetting agent that promotes the wetting of the alkaline earth metal by that liquid. Oil-soluble non-ionic, cationic or anionic wetting agents can be used for this purpose.

By lower aliphatic alcohol is meant methyl, ethyl, propyl or isopropyl alcohol as well as the various butyl and amyl-alcohols.

Inert liquids suitable for the present invention are those that do not react with the alkaline earth metal, have a density higher than the reaction mixture (about 0.85 gram per cubic centimeter) but not higher than the alkaline earth metal itself (1.55 grams per cubic centimeter) and are not appreciably miscible with the reaction mixture. Examples of such inert liquids are benzene, toluene, xylene, petroleum fractions, mineral oil, tetralin, decalin, alkylate, dimethylaniline, $\alpha$-dimethylnaphthalene, $\alpha$-methylnaphthalene, $\beta$-methylnaphthalene, $\alpha$-ethylnaphthalene, $\beta$-ethylnaphthalene, p-ethyldiphenylmethane, o-diethylbenzene, eutectic mixtures of diphenyl and diphenyl ether (Dowtherm), diphenyl ether, organo-substituted polysiloxanes (silicones) and the like.

Referring to the drawing, 10 indicates a reactor which need be nothing but a tank. The mixture of alkali and alkaline earth metals can be introduced through line 12, and the reacting alcohol through line 14. In the reactor the combination of materials is maintained under conditions in which the alkali metal is substantially completely converted to alcoholate and dissolved, while the alkaline earth metal is substantially unaffected.

Following the conversion the reaction mixture is shown as transferred through line 16 to settler 20 along with the inert denser liquid which can be supplied from line 22. In the settler the alkaline earth metal settles out from the reaction mixture which forms an upper stratum 24, into the denser liquid which forms a lower stratum 26. The lower stratum is then passed through conduit 27 to a filter 30 where the suspended alkaline earth metal is recovered. The filter can be of standard rotary vacuum-type, and is arranged to discharge alkaline earth metal through outlet 32, and to pass the filtrate through line 34 back for an additional settling operation. Other conventional liquid-solid classification equipment, such as a centrifuge, can be used in place of the filter if desired.

The upper layer 24 is removed through conduit 28 and can have any alcohol content separated out and recycled as by a precipitator 40. In the precipitator the alkali metal alcoholate is recovered by volatilizing away some or all of the alcohol that is present. The alcoholate is removed through line 42, and the excess alcohol with or without some dissolved alcoholate and small quantities of settling liquid 26 is returned through line 44 for reaction with subsequent charges of metal.

As one highly effective example of the present invention for the recovery of useful materials from the metal sludge by-product of the electrolytic production of sodium, the lower aliphatic alcohol is methanol, and the reaction is carried out in the manner described in connection with the above-identified patent until the induction period is about completed; that is, the alkali metal is substantially completely reacted but the alkaline earth metal has not yet begun to react to any appreciable extent. At the end of this time the reaction mixture consists essentially of sodium methylate, excess methanol and metallic calcium. This mixture is then discharged through line 16 where it is mixed with settling liquid. So long as the combined mixture is not permitted to stand for a time long enough to exceed the induction period, there is no difficulty from the reaction of the excess methanol with the calcium. Cooling the discharge from the reactor helps to lengthen the induction period, and is conveniently effected by chilling the settling liquid before it is introduced into line 16.

Only a few minutes of settling is all that is needed to permit the calcium to settle out practically completely into the lower layer, particularly if the settling liquid includes a wetting agent. Thus, a polydimethyl silicone oil having a viscosity of 2 centipoises and containing ½ to 3 per cent of a non-ionic wetting agent such as liquid condensation esters of the glycerol-phthalic acid type, or the condensation products of polyethylene oxide with sorbitan monolaurate or trilaurate, is very effective. Such wetting agents are also suitable for use with methylethyl polysiloxanes and methyl-phenyl polysiloxanes. In general, the settling step appears to be a purely physical phenomenon that does not depend on the chemical characteristics of the settling liquid and wetting agent so long as they are relatively inert to the alkaline earth metal. Wetting agents other than those recited above are also suitable for use with the present invention.

Instead of directly filtering the alkaline earth metal away from the settling liquid after it is separated, it can first be subjected to a preliminary concentration as by single or multi-stage centrifuging or the like, the lighter portion containing very little of the metal being then filtered separately from the heavier portion containing most of metal.

The centrifuging and/or filtering can best be carried out in an inert atmosphere, such as dry nitrogen. If the temperature of the mixture is high enough to cause appreciable vaporization of settling liquids, these treatments can be carried out in conjunction with a solvent recovery unit to reduce losses by reason of the escape of volatilized materials. When non-volatile settling liquids such as silicones are used, the separated alkaline earth metal can be washed with a solvent such as benzene to remove the liquid that adheres to the metal.

In the precipitator 40 the mixture of the above example can be flashed to drive off the excess methanol leaving a cake of sodium methylate. The calcium is recovered in good yields as crystalline platelets of 85 to 90 per cent purity.

The addition of the settling liquid to the reaction mixture can be effected with or without agitation. The use of agitation is helpful where the settling liquid is used to cool the reaction mixture for the purpose of extending the induction period, and also improves the contact between the settling liquid and the suspended particles of alkaline earth metal, particularly where the reaction with the alcohol is permitted to run somewhat over the induction period so that the particles of alkaline earth metal are reacting and carry adhering bubbles of hydrogen which tend to make them float upward rather than settle downward. However, when the induction period is not exceeded, the settling will take place fairly readily without any agitation. In fact, the reaction with the alcohol can be carried out in the reactor to a point short of completion, at which point the reaction mixture can be stratified over the settling liquid to permit the reaction with the alkaline metal to be completed while the alkaline earth metal simultaneously settles out. The reacting alkali metal being buoyed up by bubbles of hydrogen shows no appreciable tendency to settle out when this technique is used. Should there be any tendency for the alkali metal to move down through the settling liquid, this can be minimized by using a settling liquid of relatively high density, diphenyl ether for example, inasmuch as the alkali metal has a density lower than the alkaline earth metal. By making the settling liquid more dense than the alkali metal or mixtures of the alkali metal and alkaline earth metal, it will be impossible for metal particles of this type to drop below the upper surface of the settling liquid so that they will therefore remain in contact with the alcohol and continue to react in the desired manner.

Although the invention is described above in connection with a sludge of sodium and calcium prepared in a specific manner, it is equally suitable for mixtures of these metals prepared in any other way, as well as other mixtures of alkali and alkaline earth metals. By way of example, mixtures of potassium and barium, as well as sodium and magnesium are also readily separated by the above-described technique.

As many apparently widely different embodiments of this invention may be made without departing from the spirit and scope hereof, it is to be understood that the invention is not limited to the specific embodiments hereof except as defined in the appended claims.

We claim:

1. A method for recovering values from a mixture of alkali and alkaline earth metals, which method includes the steps of reacting the mixture of said metals with an excess of a lower aliphatic alcohol, and after the reaction with the alkali metal is substantially completed the combination therewith of the improvement of stratifying the reaction mixture over a liquid denser than this mixture but inert to and not denser than the alkaline earth metal to cause the alkaline earth metal in the reaction mixture to settle down into said liquid, separating the lower alkaline-earth-metal-carrying liquid, and removing the alkaline earth metal from the separated liquid.

2. A method of recovering calcium metal from admixture with alkali metal, which method includes the steps of reacting said mixture with an excess of methyl alcohol under conditions in which the alkali metal preferentially reacts and dissolves leaving the calcium substantially unreacted, the combination therewith of the improvement which consists of then stratifying the resulting reaction mixture over a substantially immiscible inert liquid which has a specific gravity of between about 0.85 and 1.55 to cause the unreacted calcium to settle into the inert lower liquid, separating the calcium-containing lower liquid and removing the calcium from the separated liquid.

3. In the recovery of calcium from mixtures of calcium and sodium by reacting the mixture with an excess of a lower aliphatic alcohol to preferentially react with and dissolve the sodium, the combination therewith of the improvement which comprises stratifying the resulting reaction mixture over a substantially immiscible inert liquid which has a specific gravity of between about 0.85 and 1.55 to cause the unreacted calcium to settle into the lower liquid, separating the calcium-containing lower liquid and removing the calcium from the separated liquid.

4. In the recovery of calcium from calcium-sodium sludges resulting from the electrolytic preparation of sodium by reacting the sludge with an excess of methanol to preferentially react with and dissolve the sodium, the combination therewith of the improvement which comprises stratifying the resulting reaction mixture over a substantially immiscible inert liquid which has a specific gravity of between about 0.85 and 1.55 to cause the unreacted calcium to settle into the lower liquid, separating the calcium-containing lower liquid and removing the calcium from the separated liquid.

5. The combination of claim 1 in which the inert liquid includes a wetting agent that promotes the wetting of the alkaline earth metal by said liquid.

6. The combination of claim 4 in which the inert liquid includes a wetting agent that promotes the wetting of the calcium by said liquid.

References Cited in the file of this patent

UNITED STATES PATENTS

| 2,483,372 | Payne | Sept. 27, 1949 |
| 2,543,399 | Calingaert | Feb. 27, 1951 |
| 2,561,862 | Hill | July 24, 1951 |